United States Patent
Kantany et al.

(10) Patent No.: US 9,835,043 B2
(45) Date of Patent: Dec. 5, 2017

(54) GUIDED BINDING-RESISTANT ACTUATION APPARATUS AND METHOD

(71) Applicant: United Technologies Corporation, Hartford, CT (US)

(72) Inventors: Nicholas W. Kantany, Manchester, CT (US); Edward Boucher, Watertown, CT (US); Kristine Marie Carnavos, Holbrook, NY (US); Adam Covino, Manchester, CT (US); Melaine Ho, Manchester, CT (US); Jorge I. Farah, Hartford, CT (US); Donald W. Peters, Colchester, CT (US)

(73) Assignee: United Technologies Corporation, Farmington, CT (US)

( * ) Notice: Subject to any disclaimer, the term of this patent is extended or adjusted under 35 U.S.C. 154(b) by 333 days.

(21) Appl. No.: 14/630,228

(22) Filed: Feb. 24, 2015

(65) Prior Publication Data

US 2017/0058692 A1 Mar. 2, 2017

Related U.S. Application Data

(60) Provisional application No. 62/058,486, filed on Oct. 1, 2014, provisional application No. 62/078,565, filed on Nov. 12, 2014.

(51) Int. Cl.
*F01D 17/14* (2006.01)
*F16K 39/04* (2006.01)
(Continued)

(52) U.S. Cl.
CPC ......... *F01D 17/145* (2013.01); *F01D 17/141* (2013.01); *F01D 17/143* (2013.01);
(Continued)

(58) Field of Classification Search
CPC .... F01D 17/141; F01D 17/143; F01D 17/145; F04D 27/0215; F16K 3/029; F16K 3/085; F16K 5/0242; F16K 39/045
(Continued)

(56) References Cited

U.S. PATENT DOCUMENTS 2,553,645 A * 5/1951 Ferro, Jr. ............... F16K 3/085
137/494
2,952,437 A * 9/1960 Knox ....................... C21B 9/12
251/171
(Continued)

FOREIGN PATENT DOCUMENTS

DE 3007601 A1 * 9/1981 ............. F16K 3/085
EP 0939230 A2 9/1999
(Continued)

OTHER PUBLICATIONS

Extended European Search Report for EP Application No. 15179139.9, dated Mar. 4, 2013, 9 pages.

*Primary Examiner* — Woody Lee, Jr.
*Assistant Examiner* — Topaz L Elliott
(74) *Attorney, Agent, or Firm* — Kinney & Lange, P.A.

(57) ABSTRACT

An air modulating system for a gas turbine engine includes a fixed plate with a fluid passage inlet, a floating plate with a first side adjacent to the fluid passage inlet, an actuated mount configured to move the floating plate relative to the fixed plate, and a linkage element for connecting the floating plate to the actuated mount. The linkage element includes a mounting flange configured to slidably engage the floating plate.

20 Claims, 7 Drawing Sheets

(51) Int. Cl.
*F04D 27/02* (2006.01)
*F01D 25/00* (2006.01)
*F01D 17/16* (2006.01)

(52) U.S. Cl.
CPC ......... *F01D 17/167* (2013.01); *F01D 25/005* (2013.01); *F04D 27/0215* (2013.01); *F16K 39/045* (2013.01); *F05D 2220/32* (2013.01); *F05D 2270/3061* (2013.01)

(58) Field of Classification Search
USPC ........................... 251/237, 85, 158, 300, 301
See application file for complete search history.

(56) References Cited

U.S. PATENT DOCUMENTS

| | | | | |
|---|---|---|---|---|
| 3,109,457 A * | 11/1963 | Oliveau | ................ | F16K 39/045 137/625.18 |
| 4,294,427 A * | 10/1981 | Cilny | ........................ | F16K 3/14 251/158 |
| 4,463,552 A * | 8/1984 | Monhardt | ................ | F01D 25/32 60/226.1 |
| 4,546,605 A * | 10/1985 | Mortimer | .............. | F01D 17/105 184/6.11 |
| 5,417,083 A * | 5/1995 | Eber | ........................ | F16K 3/085 251/129.11 |
| 6,561,483 B2 * | 5/2003 | Nakagawa | .............. | F16K 51/02 251/175 |
| 7,861,535 B2 | 1/2011 | Figueroa et al. | | |
| 8,550,430 B2 * | 10/2013 | Lamprecht | .............. | F16K 51/02 251/158 |
| 8,739,812 B2 * | 6/2014 | Brandon-Jones | ......... | F16K 3/08 137/246.11 |
| 9,163,524 B2 * | 10/2015 | Moore | ................... | F01D 17/143 |
| 9,488,281 B2 * | 11/2016 | Howes | .................... | F16K 39/04 |
| 2011/0232790 A1 * | 9/2011 | Brandon-Jones | ......... | F16K 3/08 137/625.42 |
| 2013/0140792 A1 * | 6/2013 | Harkcom | ............... | B60D 1/075 280/494 |
| 2013/0343866 A1 | 12/2013 | Christians | | |
| 2014/0230246 A1 | 8/2014 | McMahon et al. | | |
| 2014/0239084 A1 | 8/2014 | Chandler et al. | | |
| 2015/0204455 A1 * | 7/2015 | Zimmer | ................... | F16K 31/08 251/65 |

FOREIGN PATENT DOCUMENTS

| | | | | |
|---|---|---|---|---|
| EP | 1348835 A2 | 10/2003 | | |
| GB | WO 2013012461 A2 * | 8/2013 | ............. | F16K 39/04 |
| WO | WO2013191798 A1 | 12/2013 | | |
| WO | WO2014052842 A1 | 4/2014 | | |

* cited by examiner

GUIDED BINDING-RESISTANT ACTUATION APPARATUS AND METHOD

CROSS-REFERENCE TO RELATED APPLICATION(S)

This application claims priority to U.S. Provisional Application No. 62/058,468, filed Oct. 1, 2014, and entitled "Synchronized Air Modulating System," and U.S. Provisional Application No. 62/078,565, filed Nov. 12, 2014, and entitled "System and Seal Configurations for Air Modulation of a Gas Turbine Engine Heat Exchanger."

STATEMENT OF GOVERNMENT INTEREST

This invention was made, at least in part, with U.S. Government support under contract number FA8650-09-D2923, awarded by the U.S. Air Force. The U.S. Government may have certain rights in this invention.

BACKGROUND

The present invention relates to gas turbine engines, and more particularly to a floating plate assembly of an air modulating system.

Air modulating systems can be used in various locations in a gas turbine engine to control air flow. For example, air modulation systems can be used to control air flow to heat exchangers based on sensed temperatures of the fluids. Some applications of air modulation require that fluid passageways be closed to stop air flow and that passageway inlets be fully sealed to eliminate leakage. In addition, some applications require that a plurality of fluid passageways be closed and sealed synchronously. Current air modulation systems may have nontrivial leakage when closed. Additionally, actuation methods and systems used to guide doors or closure structures over air passage inlets may experience system binding due tight tolerances and deformation of components through vibrational or frictional forces.

SUMMARY

An air modulating system for a gas turbine engine includes a fixed plate with a fluid passage inlet, a floating plate with a first side adjacent to the fluid passage inlet, an actuated mount, and a linkage element for connecting the floating plate to the actuated mount. The actuated mount is configured to move the floating plate relative to the fixed plate. The linkage element includes a mounting flange configured to slidably engage the floating plate.

An actuated mount assembly for positioning a floating plate over a fluid passage of a heat exchanger of a gas turbine engine includes a fixed plate with a fluid passage inlet, a floating plate with a first side adjacent to the fluid passage inlet, an actuated mount, and a linkage element for connecting the floating plate to the actuated mount. The actuated mount is configured to move the floating plate relative to the fixed plate. The linkage element is removably fastened to the actuated mount and includes a mounting flange configured to slidably engage the floating plate.

A method of modulating fluid flow to a fluid passage inlet of a gas turbine engine includes the steps of rotating a mount circumferentially to guide a floating plate across the fluid passage inlet, creating a variable pressure load to act on a second side of the floating plate, and translating the floating plate axially relative to the mount as a function of the variable pressure load. The floating plate includes a first side with a body portion and a second side opposite the first side. The passage inlet is closed when covered by the body portion of the first side of the floating plate.

The present summary is provided only by way of example, and not limitation. Other aspects of the present disclosure will be appreciated in view of the entirety of the present disclosure, including the entire text, claims and accompanying figures.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

Figure 1:
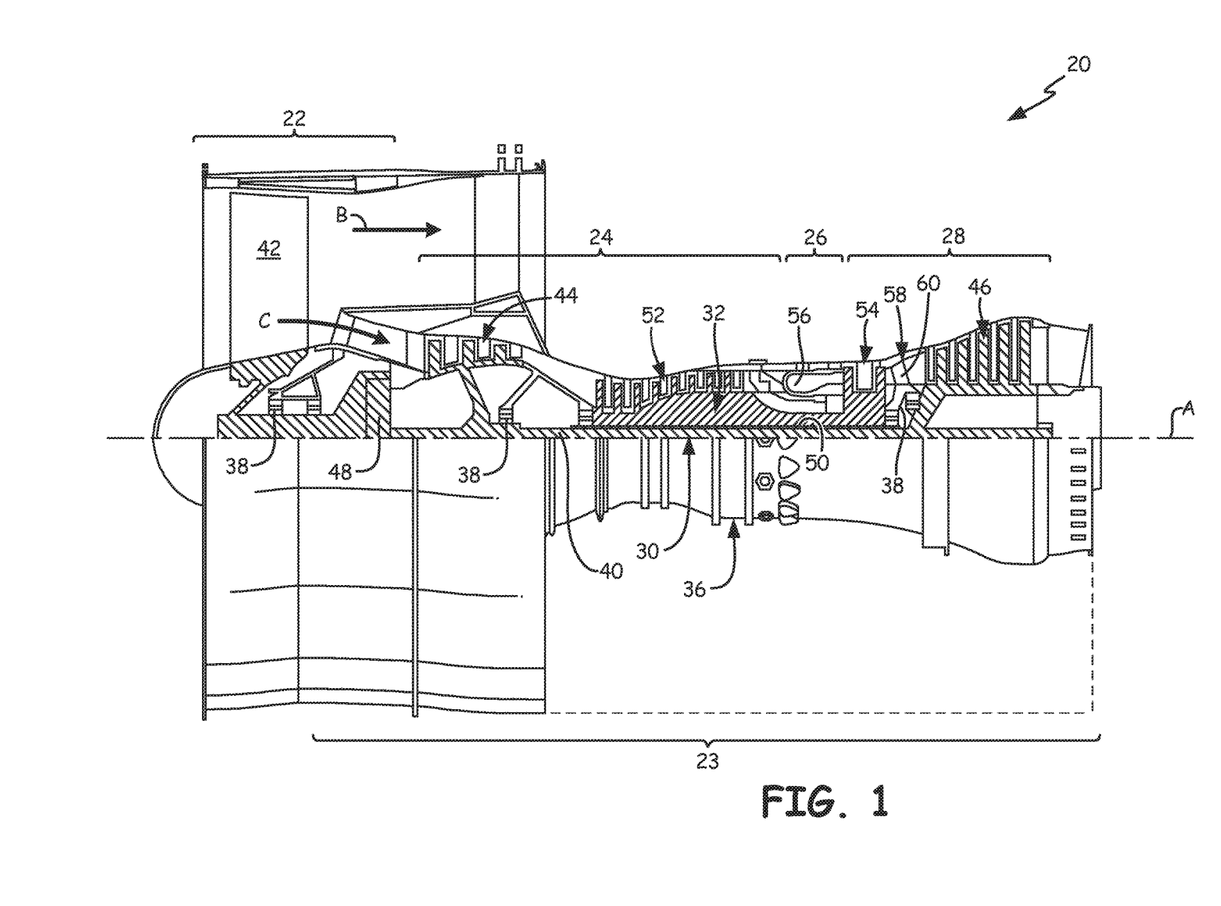
FIG. 1 is a longitudinal quarter-sectional view along an engine centerline of a gas turbine engine.

FIG. 1 is a quarter sectional view that schematically illustrates an example gas turbine engine 20 that includes a fan section 22, a compressor section 24, a combustor section 26 and a turbine section 28. Alternative engines might include an afterburner (not shown) among other systems or features. The fan section 22 drives air along a bypass flow path B through a bypass duct 23 while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example, an industrial gas turbine; a reverse-flow gas turbine engine; and a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 can be arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

Figure 2A:
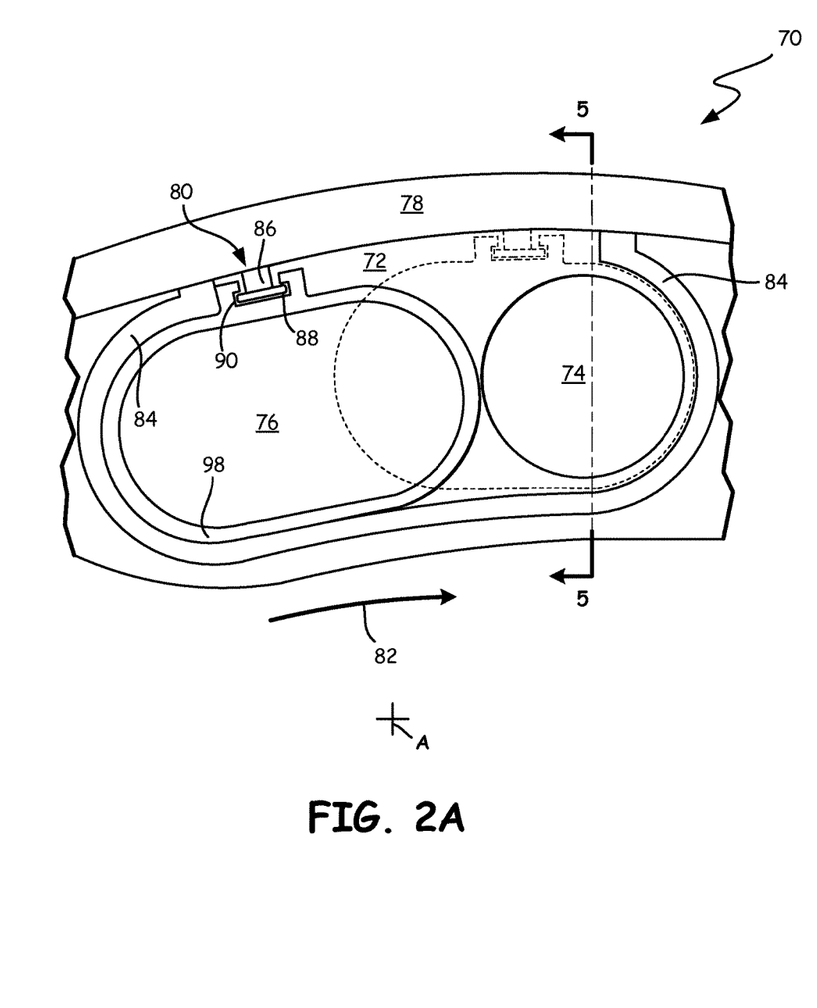
FIG. 2A is a front elevation view of one embodiment of an air modulating system floating plate assembly.

FIG. 2A is a front elevation view of one embodiment of an air modulating system 70 that includes a fixed plate 72 with a fluid passage inlet 74, a floating plate 76, an actuated mount 78, and a linkage element 80. The fixed plate 72 can be fixedly supported within engine 20 by a structure not shown. The floating plate 76 sits adjacent the fixed plate 72 and is removably connected to the actuated mount 78 through the linkage element 80. The actuated mount 78 is capable of being rotated during use such that the floating plate 76 moves along a direction 82 to cover the fluid passage inlet 74 and in an opposite direction to uncover the fluid passage inlet 74.

In one embodiment, the fixed plate 72 with a fluid passage inlet 74 comprises a heat exchanger, wherein the fluid passage inlet 74 is configured to receive a stream of fluid (e.g., air). In another embodiment, the fixed plate 72 with fluid passage inlet 74 comprises a fluid duct absent a heat exchanger. The air modulating system 70 can be located in the bypass duct 23 of the gas turbine engine 20, however, it will be understood by one skilled in the art that the air modulating system 70 is not limited to a bypass duct location. The air modulating system 70 can be used to modulate air flow in other flow paths of the gas turbine engine 20.

The actuated mount 78 can be a sync ring, which is connected to one or more actuators (not shown). The one or more actuators selectively rotate the mount 78 circumferentially about an axis A in direction 82 to close the fluid passage inlet 74 and in the opposite direction to open the fluid passage inlet 74. When the actuated mount 78 is rotated in direction 82, the floating plate 76 is moved about an inner circumference of the actuated mount 78 to cover the fluid passage inlet 74 and block fluid flow into the fluid passage inlet 74. When the actuated mount 78 is rotated in the opposite direction, the floating plate 76 is moved to uncover the fluid passage inlet 74 to allow fluid flow into the fluid passage inlet 74. The circumferential movement of the floating plate 76 is generally confined by a limited range of rotation of the actuated mount 78. However, the circumferential movement of the floating plate 76 can be further constrained by one or a plurality of stops 84, protruding from a surface of the fixed plate 72 and located at a circumferential end of movement, which catch the floating plate 76 and prevent continued movement past the stop 84.

Although the present invention is generally described in terms of open and closed positions, the floating plate 76 can also be positioned to partially open the fluid passage, covering any portion of the fluid passage inlet 74 that is less than the whole.

The linkage element 80 removably connects the actuated mount 78 to the floating plate 76. In one embodiment, the linkage element 80 includes an arm 86 extending from an inner radius of the actuated mount 78 to a flange structure 88 at an inner radial end of the arm 86. The linkage element 80 is removably fixed to the actuated mount 78 with a fastener (not shown), such that the linkage element 80 can be replaced as needed to account for deterioration through vibrational and frictional forces. Alternatively, the linkage element 80 can be integrally and monolithically formed with the actuated mount 78.

The removable linkage element 80 can be made of a material with hardness value less than that of a material or materials of the actuated mount 78 and the floating plate 76, such that deformation of the actuated mount 78 and floating plate 76 through contact with the linkage element 80 is reduced. In other words, the easily replaceable linkage element 80 can absorb wear and damage that might otherwise accrue to the larger and more difficult to replace floating plate 76 and actuated mount 78. A location of the floating plate 76 at which the floating plate 76 and linkage element 80 interact can be additionally coated with a hard coating, such as chrome carbide, to further protect the floating plate 76 from damage. The linkage element 80 can similarly be coated with a hard coating to extend the lifetime of the linkage element 80. The actuated mount 78 and the floating plate 76 in some embodiments are each made of a nickel-based superalloy (e.g., material available under the trademark INCONEL) or titanium alloy to withstand high temperatures, however, other materials may be better suited for different environments and can be used. The linkage element 80 can also be made of a nickel-based superalloy or titanium, or a material of lesser hardness to reduce damage to the floating plate. Alternatively, the linkage element 80 can be made of another material suited to the particular environment in which the air modulating system 70 is operating.

The floating plate 76 comprises a receptacle 90 for slidably receiving the linkage element 80. The receptacle 90 is substantially the same cross-sectional shape as the linkage element 80, such that the floating plate 76 is radially retained by the flange portion 88 of the linkage element 80.

Figure 2B:
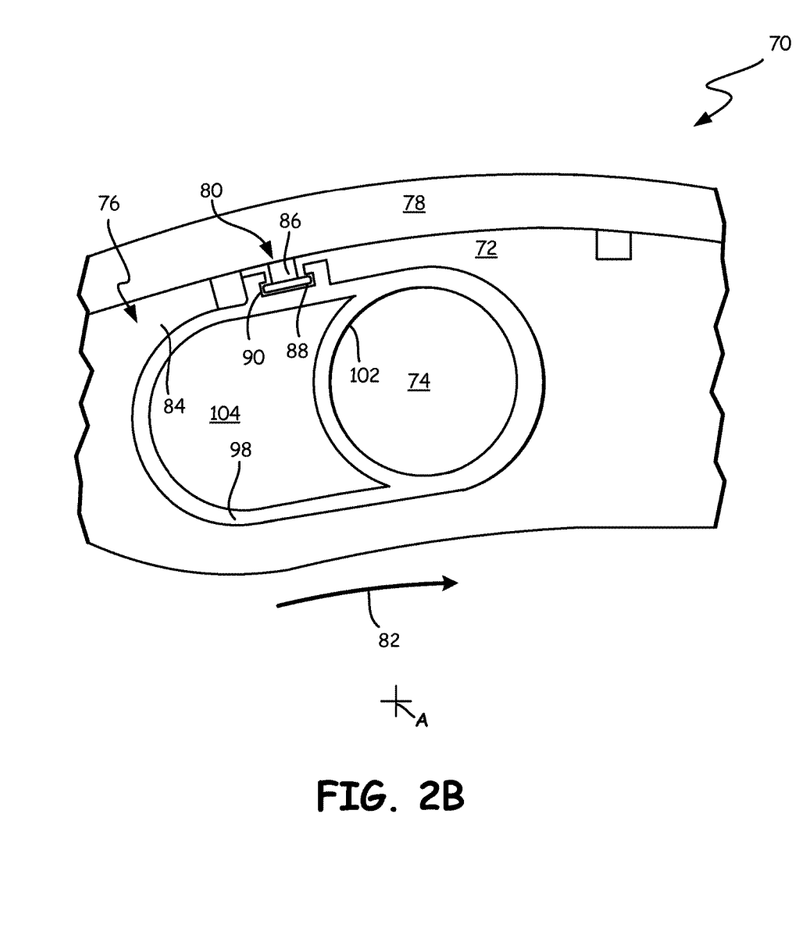
FIG. 2B is a front elevation view of another embodiment of an air modulating system floating plate assembly.

FIG. 2B shows another embodiment of the air modulating system 70 floating plate assembly of FIG. 2A. The floating plate 76 in FIG. 2B further comprises an opening 102 substantially matching the cross-sectional shape of the fluid passage inlet 74. When the actuated mount 78 is rotated in the direction 82, a body portion 104 of the floating plate 76 is moved to cover the fluid passage inlet 74 to block the flow of fluid into the fluid passage inlet 74. When the actuated mount 78 is rotated in the opposite direction, the opening 102 of the floating plate 76 aligns with the fluid passage inlet 74 thereby allowing fluid to enter the fluid passage inlet 74.

Due to manufacturing tolerances and wear and damage on the surfaces of the fixed plate 72 and floating plate 76 through vibrational and frictional forces, in any embodiment (e.g., as shown in FIG. 2A or 2B), a gap may exist or develop between the floating plate 76 and the fluid passage inlet 74 when the floating plate 76 is in a closed position. When a gap is present, a portion of fluid may reach the fluid passage inlet. To improve sealing at the fluid passage inlet, the floating plate 76 is configured to slide axially along the linkage element 80, such that the floating plate 76 makes contact with the fixed plate 72.

Figure 3:
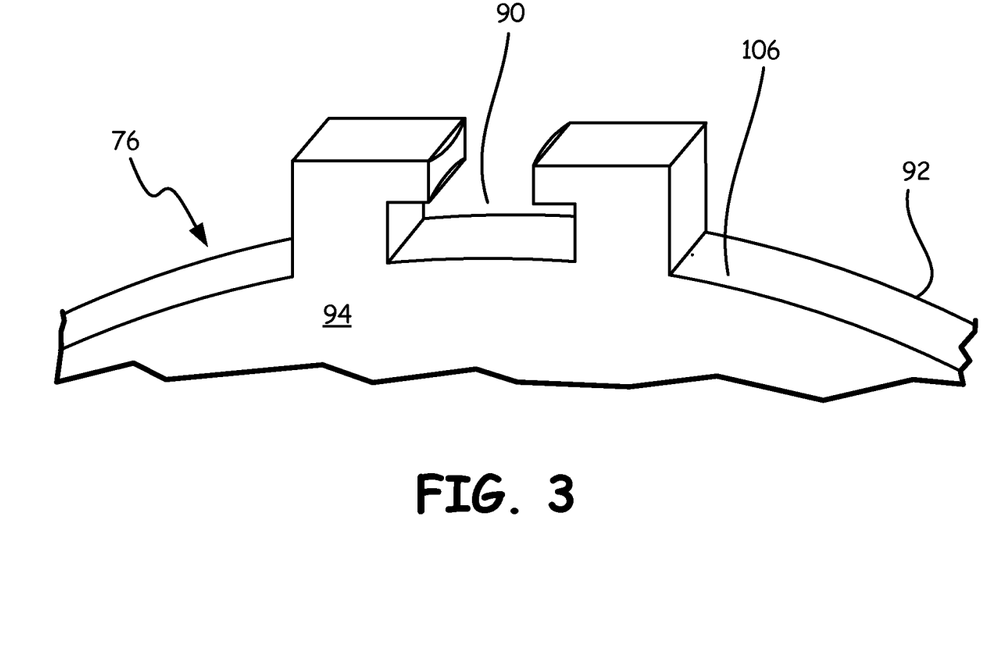
FIG. 3 is a perspective view of a portion of the floating plate that includes a linkage receptacle.

FIG. 3 shows a perspective view of the receptacle 90 of the floating plate 76 configured to slidably receive the linkage element 80. In one embodiment, the receptacle 90 is substantially the same cross-sectional shape as the linkage element 80, such that the flange portion 88 is radially retained by the receptacle 90, but larger than the cross-sectional shape of the linkage element 80 to permit the floating plate 76 to translate axially relative to the actuated mount 78 and pivot about the linkage element 80 in clockwise and counterclockwise directions. In one embodiment, the surfaces of the receptacle 90 adjacent the arm 86 of the linkage element 80 are rounded to provide the floating plate 76 additional freedom of movement about the linkage element 80. The receptacle 90 extends through a thickness 106 of the floating plate 76 such that the receptacle 90 is open at both a first side 92 and second side 94 opposite the first side 92. In one embodiment, the thickness 106 of the floating plate 76 at the receptacle 90 is greater than a thickness of the linkage element 80. In other embodiments, the thickness 106 of the floating plate 76 at the receptacle 90 is substantially the same as or less than the thickness of the linkage element 80.

Figure 4A:
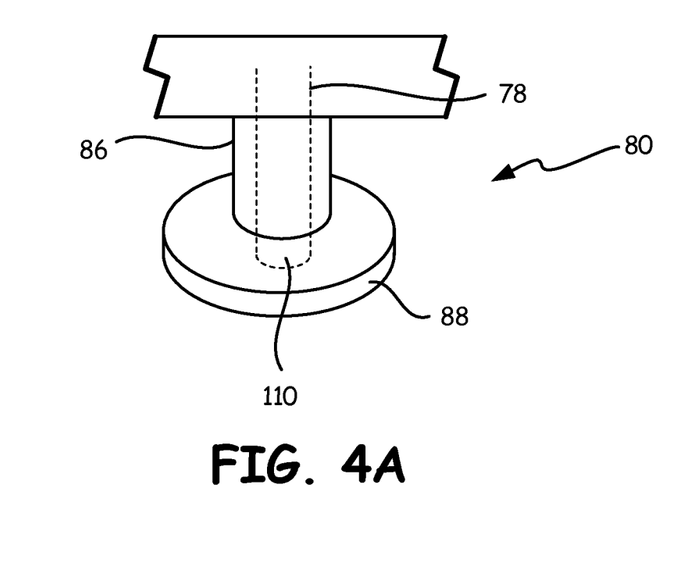
FIG. 4A is a perspective view of one embodiment of a linkage element of a floating plate assembly.

FIG. 4A shows a perspective view of one embodiment of a linkage element 80. The linkage element 80 includes a cylindrical arm 86 and larger cylindrical or puck-shaped flange 88 at a lower end of the arm 86. The arm 86 extends from an inner radius of the actuated mount 78. The linkage element 80 is removably fixed to the actuated mount 78 with a fastener 110. A bolt, nut, screw, rivet or other suitable fastener can be used to fasten the linkage element 80 to the actuated mount 78. The fastener 110 can extend through a bottom surface of the flange portion 88 radially outward and into the actuated mount 78. In one embodiment, the fastener 110 is a bolt secured with a nut at the actuated mount 78. The head of the fastener 110 is streamlined (e.g., countersunk) such that it does not extend outward from the bottom surface of the linkage element 80 and interfere with the movement of the floating plate 76. It will be understood by one skilled in the art that the positioning of the fastener can be changed without altering the function of the fastener. For example, the fastener can extend radially inward from the actuated mount 78 into the linkage element 80. Additionally, the linkage element 80 can comprise a nut for securing the fastener. Although the linkage element is generally described as being fastened to the actuated mount with an element that extends through both the actuated mount 78 and the linkage element 80, the fastener is not limited to these structures and can alternatively be a weld or suitable adhesive. Alternatively, the linkage element 80 can be integrally and monolithically formed with the actuated mount 78.

Figure 4B:
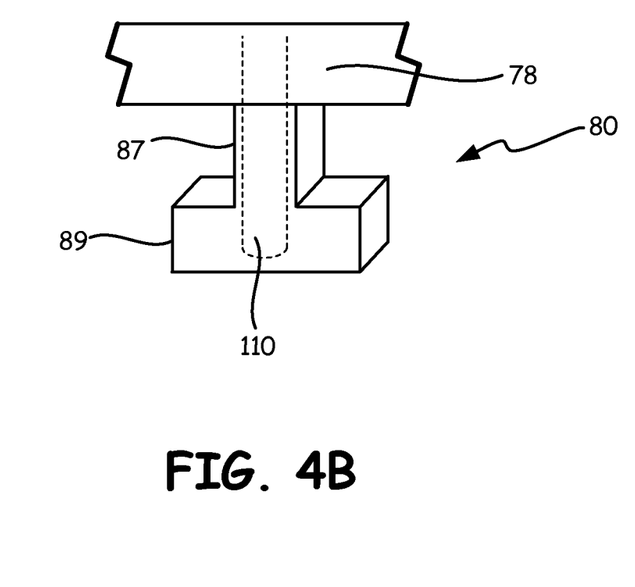
FIG. 4B is a perspective view of another embodiment of a linkage element of a floating plate assembly.

FIG. 4B shows a perspective view of another embodiment of a linkage element 80. The linkage element 80 includes an arm 87 and flange 89 at a lower end of the arm 87, which have rectangular cross-sections and which together have a T-shape. The arm 87 extends from an inner radius of the actuated mount 78. The linkage element 80 is removably fixed to the actuated mount 78 with a fastener 110 similar to that described in FIG. 4A. It will be understood to one skilled in the art that the shape of the mounting flange is not limited to the embodiments shown, but can comprise any shape that permits slidable engagement with the floating plate 76. In general, the shape of the linkage element 80 can be determined by the system requirements, such as loading and material composition. The T-shaped and puck-shaped embodiments represent only one possible system application.

Figure 5:
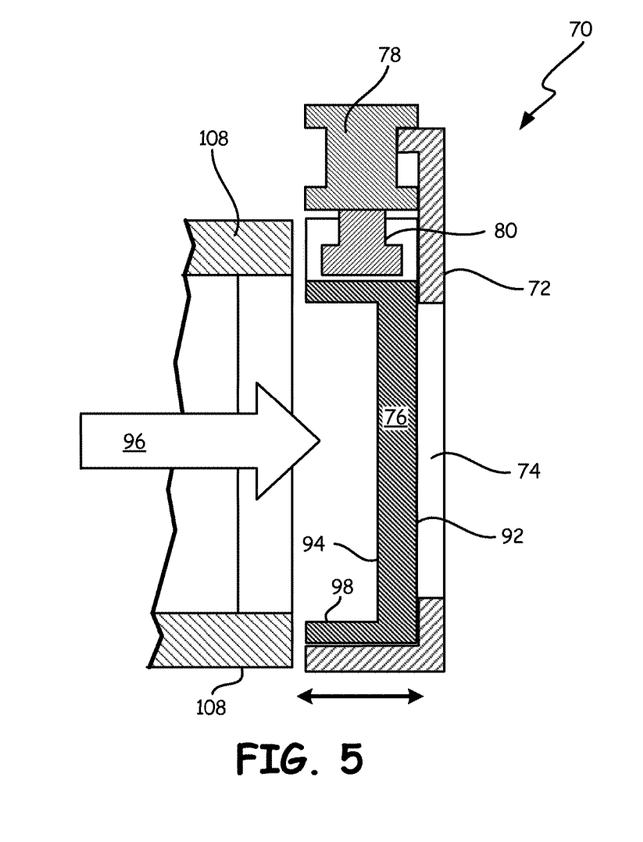
FIG. 5 is a schematic cross-sectional view of the embodiment of the air modulating system floating plate assembly of FIG. 2A, taken along the line 5-5 of FIG. 2A.

FIG. 5 shows a schematic cross-sectional view of the air modulating system 70 of FIG. 2A taken along the line 5-5 of FIG. 2A with the floating plate 76 in a fully closed position covering the fluid passage inlet 74 (shown in phantom in FIG. 2A). A fluid stream 96 acts on the second side 94 of the floating plate 76. As the fluid stream 96 is unable to enter the fluid passage inlet 74, fluid pressure (P2) increases on the second side 94, such that it exceeds fluid pressure (P1) on the first side 92 of the floating plate 76 axially adjacent the fluid passage inlet 74. The increased pressure load on the second side 94 forces the floating plate 76 to translate axially and form a seal against the fluid passage inlet 74. In some embodiments, material has been removed from the second side 94 of the floating plate 76 to reduce weight, leaving a ledge 98 on the second side 94 extending from an outer perimeter of the second side 94 of the floating plate 76 and circumscribing the second side 94 of the floating plate 76.

When the actuated mount 78 is rotated to open the fluid passage inlet 74, the pressure load on the second side 94 of the floating plate 76 is reduced as fluid begins to flow into the fluid passage inlet 74. With the reduced pressure load on the second side 94, the floating plate 76 can translate axially away from the fixed plate 72 and fluid passage inlet 74. As the floating plate 76 is moved across the fixed plate 72 with the rotation of the actuated mount 78, the axial position of the floating plate 76 relative to the fixed plate 72 is self-corrected to reduce or prevent system binding. The ability of the floating plate 76 to self-correct positioning relative the fixed plate additionally accommodates manufacturing tolerances, pressure deflections of the hardware, and thermal distortion of the hardware.

A fixed member 108, which can be fixedly supported relative to the engine 20, prevents the floating plate 76 from axially disengaging from the linkage element 80. The floating plate 76 is retained in a space between the fixed plate 72 and the fixed member 108 at both open and closed positions and as the floating plate 76 is moved circumferentially between open and closed positions. The fixed member 108 can be an air flow duct or similar structure configured to direct fluid flow. In one embodiment, the fixed member 108 comprises an air flow duct with a cross-sectional opening substantially the same shape as the fluid passage inlet 74. The circumference of the duct body serves as the retaining member and the duct comprises an additional retaining body (not shown) to limit axial movement of the floating plate 76, such as when the floating plate 76 is transitioning to and is in a closed position.

Figure 6:
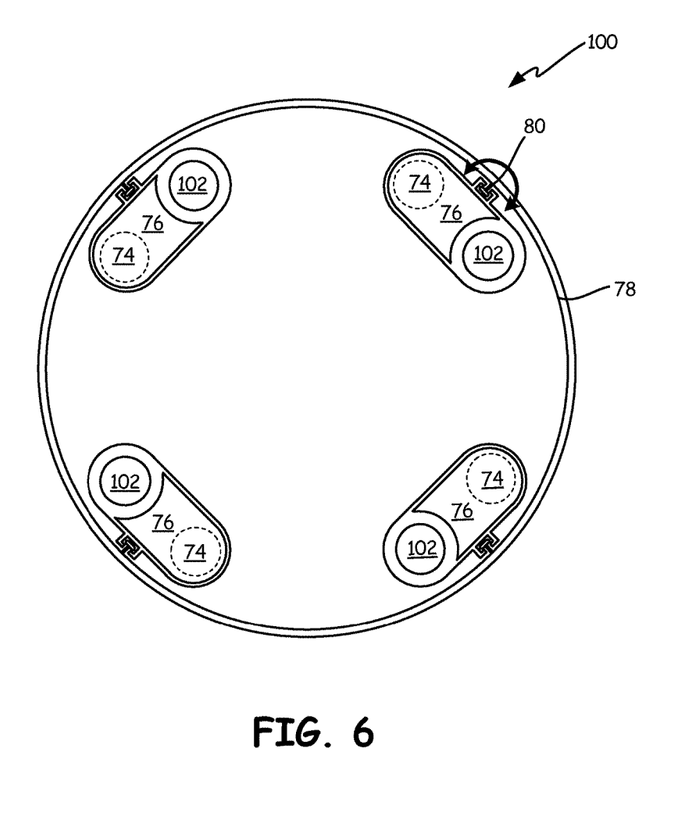
FIG. 6 is a schematic view of one embodiment of an air modulating system.

FIG. 6 shows a schematic view of one embodiment of air modulating system 100 that includes a plurality of floating plates 76 and fixed plates 72 with fluid passage inlets 74 (covered by the body portion 104 of the floating plates 76). Although the floating plates 76 shown in FIG. 6 are each substantially the same as the single floating plate 76 shown in FIG. 2B, the floating plate 76 of FIG. 2A, or some combination of FIG. 2A and 2B, could similarly be adapted to an air modulating system with a plurality of floating plates 76. FIG. 6 shows four floating plates 76, however, it will be understood by one skilled in the art that the number of plates can vary to accommodate the needs of the system and may be limited only by the physical dimensions or size constraints of the system. The four floating plates 76 shown in FIG. 6 are connected to a single actuated mount 78, such that when the actuated mount 78 is rotated about the axis A, all four floating plates 76 rotate synchronously with the actuated mount 78. When the actuated mount 78 is rotated in a clockwise direction, the floating plates 76 move circumferentially to cover the corresponding fluid passage inlets 74. When the actuated mount 78 is rotated in a counterclockwise direction, the floating plates 76 are moved with the actuated mount 78 to open the corresponding fluid passage inlets 74. Each floating plate 76 independently translates axially in relation to the actuated mount 78 to form a seal with the corresponding fixed plates 72 and fluid passage inlets 74. In addition, each floating plate 76 independently pivots about a linkage element 80 when moved circumferentially by the actuated mount 78. As the actuated mount 78 is rotated, the position of each floating plate 76 is independently self-corrected through the pivoting and axial movement of each floating plate 76 along the corresponding linkage element 80. The self-correcting positioning of each floating plate 76 reduces or prevents system binding upon actuation and helps decouple any misalignment of one or more floating plates 76 from affecting other floating plates 76 or the actuated mount 78.

Discussion of Possible Embodiments

The following are non-exclusive descriptions of possible embodiments of the present invention.

An air modulating system includes a fixed plate with a fluid passage inlet, a floating plate with a first side adjacent to the fluid passage inlet, an actuated mount, and a linkage element for connecting the floating plate to the actuated mount. The actuated mount is configured to move the floating plate relative to the fixed plate. The linkage element comprises a mounting flange configured to slidably engage the floating plate.

The air modulating system of the preceding paragraph can optionally include, additionally and/or alternatively, any one or more of the following features, configurations and/or additional components:

a further embodiment of the foregoing air modulating system, wherein the linkage element is removably fastened to the actuated mount.

a further embodiment of the foregoing air modulating system, wherein the floating plate further comprises a receptacle for slidably receiving the mounting flange of the linkage element.

a further embodiment of the foregoing air modulating system, wherein the receptacle is substantially the same cross-sectional shape as the mounting flange.

a further embodiment of the foregoing air modulating system, wherein the receptacle extends through a thickness of the floating plate such that it is open at both the first side and a second side opposite the first side.

a further embodiment of the foregoing air modulating system, wherein the thickness of the floating plate at the receptacle, comprising the distance from the first side to the second side, is greater than a thickness of the mounting flange.

a further embodiment of the foregoing air modulating system, wherein the floating plate is configured to pivot about the mounting flange.

a further embodiment of the foregoing air modulating system, wherein the floating plate further comprises a ledge on a second side of the floating plate opposite the first side, wherein the ledge extends from an outer perimeter of the second side of the floating plate and circumscribes the second side of the floating plate.

a further embodiment of the foregoing air modulating system, wherein the floating plate further comprises an opening, wherein the opening is substantially the same cross-sectional shape as the fluid passage inlet.

a further embodiment of the foregoing air modulating system, wherein the actuated mount comprises a sync ring configured to move the plurality of floating plates circumferentially and wherein the plurality of floating plates abut the plurality of fluid passage inlets to restrict fluid flow into the fluid passage inlets.

a further embodiment of the foregoing air modulating system, wherein the air modulating system further comprises: a fixed member, wherein the floating plate is retained in a space between the fixed plate and the fixed member.

An actuated mount assembly for positioning a floating plate over a fluid passage of a heat exchanger of a gas turbine engine includes a fixed plate with a fluid passage inlet, a floating plate with a first side adjacent to the fluid passage inlet, an actuated mount, and a linkage element connecting the floating plate to the actuated mount. The actuated mount is configured to move the floating plate relative to the fixed plate. The linkage element is removably fastened to the actuated mount and has a mounting flange to slidably engage the floating plate.

The actuated mount assembly of the preceding paragraph can optionally include, additionally and/or alternatively, any one or more of the following features, configurations and/or additional components:

a further embodiment of the foregoing actuated mount assembly, wherein the floating plate further comprises an opening substantially matching the cross-sectional shape of the fluid passage inlet, and wherein the fluid passage inlet and the opening of the floating plate align to allow fluid to move into the fluid passage of the heat exchanger.

a further embodiment of the foregoing actuated mount assembly, wherein the floating plate comprises a receptacle for receiving the mounting flange of the linkage element, and wherein the receptacle extends through a thickness of the floating plate such that the receptacle is open at both the first side and a second side opposite the first side and the receptacle is substantially the same cross-sectional shape as the mounting flange.

a further embodiment of the foregoing actuated mount assembly, wherein the floating plate further comprises a ledge on a second side of the floating plate opposite the first side, wherein the ledge extends from an outer perimeter of the second side of the floating plate and circumscribes the second side of the floating plate.

a further embodiment of the foregoing actuated mount assembly, wherein further comprising a plurality of linkage elements, a plurality of circumferentially spaced floating plates, and a plurality of circumferentially spaced fluid passage inlets.

A method of modulating fluid flow to a fluid passage inlet of a gas turbine engine comprising the steps of rotating a mount circumferentially to guide the floating plate across the fluid passage inlet, creating a variable pressure load to act on the floating plate, and translating the floating plate axially relative to the mount as a function of the variable pressure load. The floating plate includes a first side with a body portion and a second side opposite the first side. The fluid passage inlet is closed when the fluid passage inlet is covered by the body portion of the first side of the floating plate. The variable pressure load acts on the second side of the floating plate to translate the floating plate axially relative to the mount.

The method of the preceding paragraph can optionally include, additionally and/or alternatively, any one or more of the following features, configurations and/or additional steps:

a further embodiment of the foregoing method of modulating fluid flow to a fluid passage inlet, further comprising inserting a linkage element into a receptacle of the floating plate such that the floating plate is slidably engaged with the linkage element.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An air modulating system for a gas turbine engine, the air modulating system comprising: a fixed plate comprising a fluid passage inlet; a floating plate with a first side, wherein the first side is adjacent to the fluid passage inlet; an actuated mount configured to move the floating plate relative to the fixed plate, wherein the floating plate is moved circumferentially about an axis; and a linkage element for connecting the floating plate to the actuated mount, wherein the linkage element comprises a mounting flange configured to slidably engage the floating plate and allow the floating plate to translate along the axis to contact the fixed plate in response to a variable fluid pressure load on the second side of the floating plate.

2. The air modulating system of claim 1, wherein the linkage element is removably fastened to the actuated mount.

3. The air modulating system of claim 1, wherein the floating plate further comprises a receptacle for slidably receiving the mounting flange of the linkage element.

4. The air modulating system of claim 3, wherein the receptacle is substantially the same cross-sectional shape as the mounting flange.

5. The air modulating system of claim 3, wherein the receptacle extends through a thickness of the floating plate such that it is open at both the first side and a second side opposite the first side.

6. The air modulating system of claim 5, wherein the thickness of the floating plate at the receptacle, comprising the distance from the first side to the second side, is greater than a thickness of the mounting flange.

7. The air modulating system of claim 1, wherein the floating plate is configured to pivot about the mounting flange.

8. The air modulating system of claim 1, wherein the floating plate further comprises a ledge on a second side of the floating plate opposite the first side, wherein the ledge extends from an outer perimeter of the second side of the floating plate and circumscribes the second side of the floating plate.

9. The air modulating system of claim 1, wherein the floating plate further comprises an opening, wherein the opening is substantially the same cross-sectional shape as the fluid passage inlet.

10. The air modulating system of claim 1, and further comprising a plurality of linkage elements, a plurality of circumferentially spaced floating plates, and a plurality of circumferentially spaced fluid passage inlets.

11. The air modulating system of claim 10, wherein the actuated mount comprises a sync ring configured to move the plurality of floating plates circumferentially and wherein the plurality of floating plates abut the plurality of fluid passage inlets to restrict fluid flow into the fluid passage inlets.

12. The air modulating system of claim 1, and further comprising:
a fixed member, wherein the floating plate is retained in a space between the fixed plate and the fixed member.

13. The air modulating system of claim 2, wherein the linkage element comprises a material of lower hardness value than materials comprising the actuated mount and floating plate.

14. An actuated mount assembly for positioning a floating plate over a fluid passage of a heat exchanger of a gas turbine engine, the actuated mount assembly comprising: a fixed plate comprising a fluid passage inlet; a floating plate with a first side, wherein the first side is adjacent to the fluid passage inlet; an actuated mount configured to move the floating plate relative to the fixed plates wherein the floating plate is moved circumferentially about an axis; and a linkage element for connecting the floating plate to the actuated mount, wherein the linkage element comprises a mounting flange configured to slidably engage the floating plate and allow the floating plate to translate along the axis to contact the fixed plate in response to a variable fluid pressure load on the second side of the floating plate, and wherein the linkage element is removably fastened to the actuated mount.

15. The actuated mount assembly of claim 14, wherein the floating plate further comprises an opening substantially matching the cross-sectional shape of the fluid passage inlet, and wherein the fluid passage inlet and the opening of the floating plate align to allow fluid to move into the fluid passage of the heat exchanger.

16. The actuated mount assembly of claim 14, wherein the floating plate comprises a receptacle for receiving the mounting flange of the linkage element, and wherein the receptacle extends through a thickness of the floating plate such that the receptacle is open at both the first side and a second side opposite the first side and the receptacle is substantially the same cross-sectional shape as the mounting flange.

17. The actuated mount assembly of claim 14, wherein the floating plate further comprises a ledge on a second side of the floating plate opposite the first side, wherein the ledge extends from an outer perimeter of the second side of the floating plate and circumscribes the second side of the floating plate.

18. The actuated mount assembly of claim 14, further comprising a plurality of linkage elements, a plurality of circumferentially spaced floating plates, and a plurality of circumferentially spaced fluid passage inlets.

19. A method of modulating fluid flow to a fluid passage inlet of a gas turbine engine, the method comprising the steps of:
rotating a mount circumferentially to guide a floating plate circumferentially about an axis and thereby across the fluid passage inlet, wherein the floating plate includes a first side with a body portion and a second side opposite the first side, and wherein the passage inlet is closed when the passage inlet is covered by the body portion of the first side of the floating plate;
creating a variable pressure load to act on the second side of the floating plate; and
translating the floating plate along the axis as a function of the variable pressure load, wherein translating the floating plate along the axis causes the first side to contact a surface forming the passage inlet.

20. The method of claim 19, further comprising inserting a linkage element into a receptacle of the floating plate such that the floating plate is slidably engaged with the linkage element.

* * * * *